(12) United States Patent
Bristol et al.

(10) Patent No.: US 7,946,105 B2
(45) Date of Patent: May 24, 2011

(54) BI-DIRECTIONAL LOCKING RING ASSEMBLY FOR AIRCRAFT THRUST REVERSER MANUAL DRIVE UNIT

(75) Inventors: Brent L. Bristol, Phoenix, AZ (US); Kevin K. Chakkera, Chandler, AZ (US); Peter J. Auer, Chandler, AZ (US); Remo N. Neri, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1238 days.

(21) Appl. No.: 11/592,468

(22) Filed: Nov. 2, 2006

(65) Prior Publication Data

US 2008/0105074 A1  May 8, 2008

(51) Int. Cl.
*F02K 3/02* (2006.01)
*F02K 1/00* (2006.01)
*F02K 1/54* (2006.01)

(52) U.S. Cl. ...................... 60/226.2; 60/230; 244/110 B (58) Field of Classification Search ............... 60/226.2, 60/230; 244/110 B; 239/265.37, 265.39, 239/265.29, 265.25; 91/41, 44; 92/15, 21 R, 92/21 MR
See application file for complete search history.

(56) References Cited

U.S. PATENT DOCUMENTS

| | | | |
|---|---|---|---|
| 232,363 A | 9/1880 | Ogborn | |
| 309,876 A | 12/1884 | Reising | |
| 734,420 A | 7/1903 | Kirkhuff | |
| 812,216 A | 2/1906 | Lorimer | |
| 1,302,096 A * | 4/1919 | Snyder | 91/43 |
| 2,932,164 A | 4/1960 | Watson | |
| 2,944,394 A | 7/1960 | Peregrine | |
| 2,954,849 A | 10/1960 | Bigos | |
| 3,036,431 A | 5/1962 | Vdolek | |
| 3,086,360 A | 4/1963 | Gavin | |
| 3,344,604 A | 10/1967 | Mattia et al. | |
| 3,348,454 A | 10/1967 | Kahn et al. | |
| 3,633,458 A | 1/1972 | Ito | |
| 3,655,134 A * | 4/1972 | Greenland et al. | 239/265.37 |
| 3,795,105 A * | 3/1974 | Aschauer | 60/221 |
| 3,920,204 A | 11/1975 | Bissell et al. | |
| 3,981,450 A | 9/1976 | McCardle, Jr. et al. | |
| 4,210,066 A * | 7/1980 | Aldrich | 91/506 |
| 4,297,844 A | 11/1981 | Halin et al. | |
| 4,391,409 A | 7/1983 | Scholz | |

(Continued)

FOREIGN PATENT DOCUMENTS

EP  0801221  10/1997

(Continued)

*Primary Examiner* — Michael Cuff
*Assistant Examiner* — Gerald L Sung
(74) *Attorney, Agent, or Firm* — Ingrassia Fisher & Lorenz, P.C.

(57) ABSTRACT

A bi-directional locking ring assembly is provided comprising a housing and a gear having a plurality of teeth. The gear is coupled to the housing to rotate in opposite directions about a rotational axis. A pin is also coupled to the housing and has an apex configured to travel along a line that does not pass through the rotational axis of the gear. The pin is configured to translate between (1) a disengaged position wherein the gear is free to rotate, and (2) an engaged position wherein the apex resides between two of the plurality of teeth to prevent rotation of the gear in both rotational directions. A pin actuator is coupled to the housing and configured to engage the pin to selectively lock the pin in the engaged position.

19 Claims, 6 Drawing Sheets

U.S. PATENT DOCUMENTS

| | | | |
|---|---|---|---|
| 4,527,391 A | * | 7/1985 | Marx et al. ............... 60/226.2 |
| 4,586,329 A | | 5/1986 | Carlin |
| 4,790,495 A | | 12/1988 | Greathouse et al. |
| 5,046,689 A | | 9/1991 | Shine |
| 5,209,057 A | | 5/1993 | Remlaoui |
| 5,224,342 A | | 7/1993 | Lair |
| 5,243,817 A | | 9/1993 | Matthias |
| 5,280,704 A | | 1/1994 | Anderson et al. |
| 5,359,848 A | | 11/1994 | Davies |
| 5,404,714 A | | 4/1995 | Davies |
| 5,448,884 A | | 9/1995 | Repp |
| 5,547,130 A | | 8/1996 | Davies |
| 5,609,020 A | | 3/1997 | Jackson et al. |
| 5,735,557 A | | 4/1998 | Harvey |
| 5,765,362 A | | 6/1998 | Gonidec et al. |
| 5,779,192 A | | 7/1998 | Metezeau et al. |
| 5,819,527 A | | 10/1998 | Fournier |
| 5,826,823 A | | 10/1998 | Lymons et al. |
| 5,893,265 A | | 4/1999 | Gonidec et al. |
| 5,904,041 A | | 5/1999 | Dhainault |
| 5,930,991 A | | 8/1999 | Fournier et al. |
| 5,953,904 A | | 9/1999 | Mountney |
| 5,956,939 A | | 9/1999 | Fage |
| 5,960,626 A | | 10/1999 | Baudu et al. |
| 5,984,241 A | * | 11/1999 | Sparks .......................... 244/224 |
| 5,997,054 A | | 12/1999 | Baudu et al. |
| 6,009,702 A | | 1/2000 | Gonidec et al. |
| 6,021,636 A | | 2/2000 | Johnson et al. |
| 6,027,071 A | | 2/2000 | Lair |
| 6,044,641 A | | 4/2000 | Baudu et al. |
| 6,045,091 A | | 4/2000 | Baudu et al. |
| 6,050,522 A | | 4/2000 | Brossier et al. |
| 6,138,449 A | | 10/2000 | Hudson |
| 6,145,786 A | | 11/2000 | Baudu et al. |
| 6,148,607 A | | 11/2000 | Baudu et al. |
| 6,216,980 B1 | | 4/2001 | Baudu et al. |
| 6,293,489 B1 | | 9/2001 | Davies |
| 6,293,495 B1 | | 9/2001 | Aten et al. |
| 6,343,769 B1 | | 2/2002 | Davies |
| 6,487,846 B1 | | 12/2002 | Chakkera et al. |
| 6,604,355 B1 | | 8/2003 | Sternberger |
| 6,622,474 B1 | | 9/2003 | Sternberger et al. |
| 6,625,972 B1 | | 9/2003 | Sternberger |
| 6,625,973 B1 | | 9/2003 | Langford et al. |
| 6,666,307 B1 | | 12/2003 | Christensen |
| 6,786,039 B2 | | 9/2004 | Chakkera et al. |
| 6,786,315 B1 | | 9/2004 | Christensen |
| 6,935,097 B2 | | 8/2005 | Eschborn |
| 2002/0007625 A1 | | 1/2002 | Fournier et al. |
| 2002/0144499 A1 | | 10/2002 | Rouyer et al. |
| 2003/0024236 A1 | | 2/2003 | Lymons et al. |
| 2003/0042358 A1 | | 3/2003 | Sternberger |
| 2003/0066284 A1 | * | 4/2003 | Chakkera et al. ............ 60/226.2 |
| 2003/0159429 A1 | | 8/2003 | Langston et al. |
| 2003/0201364 A1 | | 10/2003 | Sternberger |
| 2004/0112040 A1 | | 6/2004 | Kortum et al. |
| 2004/0139724 A1 | | 7/2004 | Colotte et al. |
| 2004/0195432 A1 | | 10/2004 | Christensen |
| 2004/0206066 A1 | | 10/2004 | Eschborn |
| 2004/0231317 A1 | | 11/2004 | Dehu et al. |
| 2005/0001095 A1 | | 1/2005 | Christensen |
| 2005/0040284 A1 | | 2/2005 | Christensen et al. |
| 2006/0059886 A1 | | 3/2006 | Strunk et al. |
| 2006/0101806 A1 | * | 5/2006 | Ahrendt ....................... 60/226.2 |

FOREIGN PATENT DOCUMENTS

| | | |
|---|---|---|
| GB | 913699 | 12/1959 |
| GB | 2380755 | 4/2003 |
| WO | WO 8600862 | 2/1986 |
| WO | WO 0157382 | 8/2001 |

* cited by examiner

FIG. 1

PRIOR ART

BI-DIRECTIONAL LOCKING RING ASSEMBLY FOR AIRCRAFT THRUST REVERSER MANUAL DRIVE UNIT

TECHNICAL FIELD

The present invention relates to aircraft thrust reversers and, more particularly, to a bi-directional locking ring assembly for use in conjunction with the manual drive unit of an aircraft thrust reverser.

BACKGROUND

Jet engine aircraft typically employ thrust reversers to supplement landing gear brakes and aerodynamic drag components (e.g., flaps, spoilers, etc.) to slow the aircraft upon landing. A number of thrust reverser designs are known and utilized, including cascade-type thrust reversers, target-type thrust reversers, and pivot door thrust reversers. Each of these thrust reverser designs employs a different type of moveable thrust reverser component, which may be selectively moved between a deployed (landing) and a stowed (in flight) position. When the moveable thrust reverser components are in a deployed (landing) position, the thrust reverser redirects the jet engine's rearward thrust in a generally forward direction. Conversely, when the moveable thrust reverser components are in a stowed (in flight) position, the thrust reverser does not redirect the jet engine's thrust. As an example, one known type of cascade thrust reverser employs a plurality of translating sleeves or cowls ("transcowls"), which covers a series of cascade vanes circumferentially disposed around a jet engine fan case when in the stowed (in flight) position. When the transcowls are moved into the deployed (landing) position, the cascade vanes are exposed and airflow is directed through the exposed cascade veins to produce reward thrust.

Actuators are employed to move the moveable thrust reverser components (e.g., the transcowls) between stowed and deployed positions. For example, a plurality of ballscrew actuators may be coupled to one or more transcowls and cooperate to actuate the transcowls between stowed and deployed positions. A motor (e.g., a dual output power drive unit or PDU) is coupled to each of the ballscrew actuators by way of a plurality of drive mechanisms (e.g., flexible rotatable shafts). The drive mechanisms interconnect the ballscrew actuators to ensure synchronized movement of the transcowls. In response to commands received from a controller, the PDU causes the ballscrew actuators to move the transcowls forward or aft between stowed and deployed positions to cover or uncover the cascade vanes, respectively.

To facilitate thrust reverser maintenance, the actuation system preferably permits the moveable thrust reverser components (e.g., the transcowls) to be manually moved between the stowed position and the deployed position. This may be accomplished by providing at least one ballscrew actuator with a manual drive unit (MDU), which may be configured to receive a specialized tool to permit the manual rotation of the ballscrew actuator. The MDU is preferably provided with a locking mechanism capable of securing the ballscrew actuator in a desired position to maintain the transcowl in any position between the stowed and deployed positions. This locking mechanism may be a bi-directional locking ring assembly comprising, for example, a rack tooth and a spur gear. The rack tooth is configured to translate between a disengaged position that permits spur gear rotation and an engaged position wherein the rack tooth resides between two teeth of the spur gear and physically prevents spur gear rotation.

Known bi-directional locking ring assemblies suffer from at least one disadvantage; i.e., when the apex of the rack tooth contacts the apex or tip of a spur gear tooth, a stable jamming condition occurs. Such a stable jamming condition may prevent the locking mechanism from moving fully into the engaged position and may result in damage to MDU components. Therefore, it should be appreciated that it would be desirable to provide a bi-directional locking ring assembly that substantially eliminates the occurrence of stable jamming conditions. Furthermore, other desirable features and characteristics of the present invention will become apparent from the subsequent detailed description of the invention and the appended claims, taken in conjunction with the accompanying drawings and this background of the invention.

BRIEF SUMMARY

A bi-directional locking ring assembly is provided comprising a housing and a gear having a plurality of teeth. The gear is coupled to the housing to rotate in opposite directions about a rotational axis. A pin is also coupled to the housing and has an apex configured to travel along a line that does not pass through the rotational axis of the gear. The pin is configured to translate between (1) a disengaged position wherein the gear is free to rotate, and (2) an engaged position wherein the apex resides between two of the plurality of teeth to prevent rotation of the gear in both rotational directions. A pin actuator is coupled to the housing and configured to engage the pin to selectively lock the pin in the engaged position.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
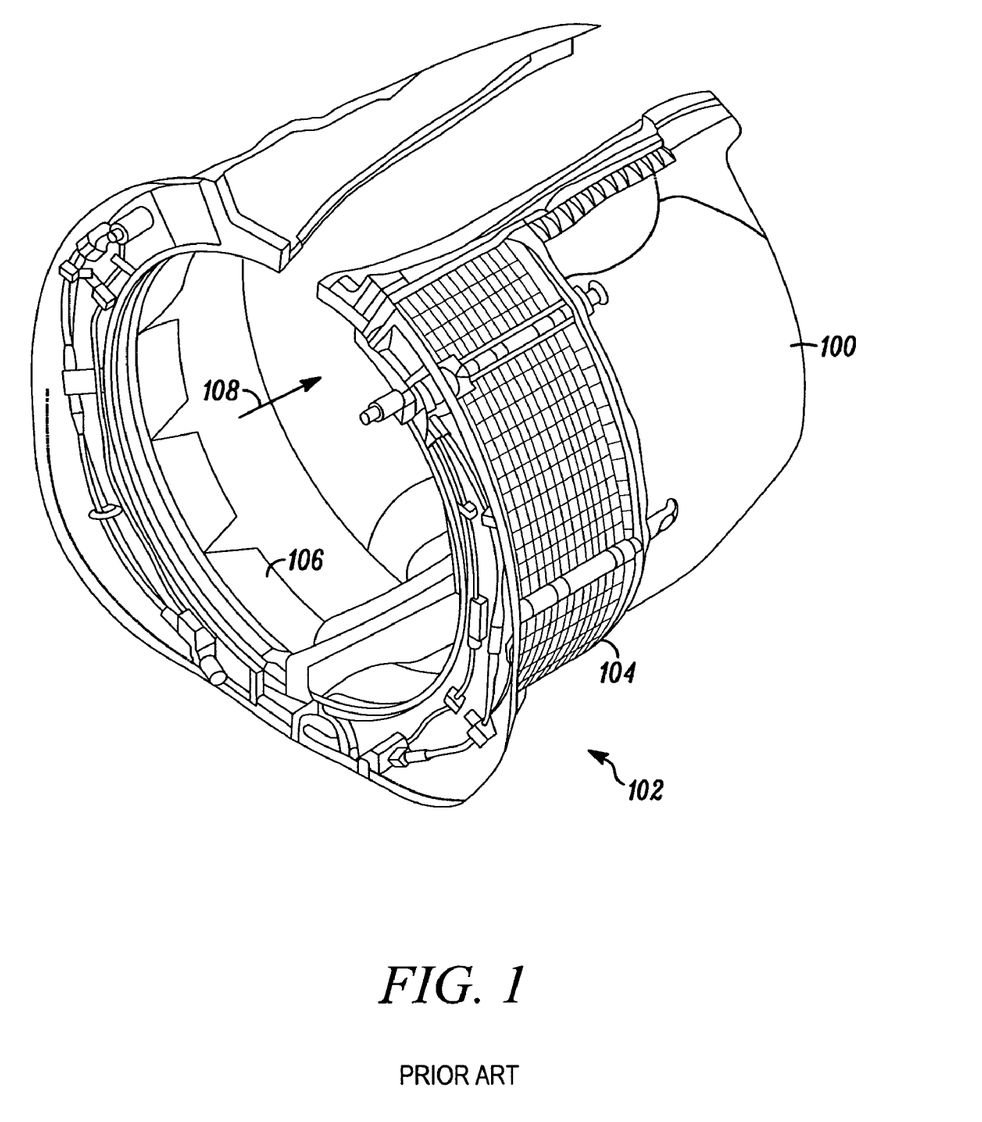
FIG. 1 is an isometric view of an engine fan case incorporating a cascade-type thrust reverser.

FIG. 1 is an isometric view of a jet engine fan case 100 incorporating a cascade-type thrust reverser system 102 deployed on an aircraft (not shown). Thrust reverser 102 comprises a plurality of cascade vanes 104 disposed on a circumferential portion of case 100. Cascade vanes 104 are illustrated as exposed in FIG. 1; however, vanes 104 are typically covered by a plurality of (e.g., two) translating sleeves or cowls commonly referred to as transcowls and discussed below in conjunction with FIG. 2. The transcowls are mechanically linked to a series of blocker doors 106, which are moveable between stowed and deployed positions. In the stowed position (illustrated in FIG. 1), blocker doors 106 are oriented parallel to a bypass airflow path 108. When thrust reverser system 102 is activated, the transcowls translate aft to expose cascade vanes 104 and blocker doors 106 rotate into a deployed position. In the deployed position, blocker doors 106 obstruct bypass airflow path 108 and redirect air flowing through fan case 100 into exposed cascade vanes 104, which, direct the airflow in a generally forward direction. This creates a reverse thrust, which helps to slow the aircraft upon landing.

Figure 2:
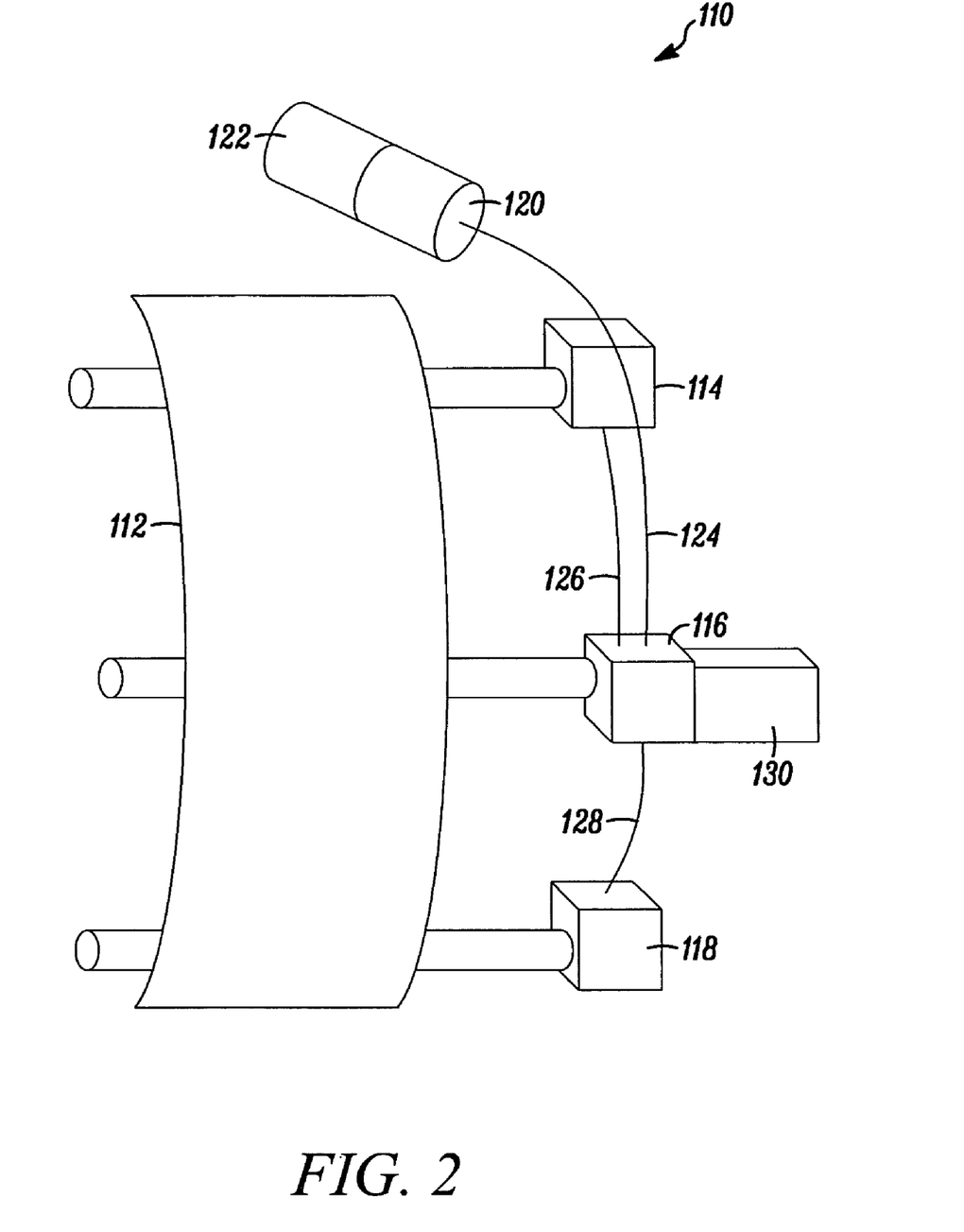
FIG. 2 is an isometric view of a portion of a transcowl actuation system including a manual drive unit (MDU)

FIG. 2 is an isometric view of a portion of a transcowl actuation system 110 suitable for use in conjunction with thrust reverser system 102 (FIG. 1). Transcowl actuation system 110 comprises a transcowl 112 fixedly coupled to a plurality of (e.g., three) ball ballscrew actuators (i.e., an upper actuator 114, a central actuator 116, and a lower actuator 118). A motor 120, including a brake 122 (e.g., torque activated brake assembly), is directly coupled to central actuator 116 by way of a drive mechanism 124 (e.g., a flexible drive shaft). Central actuator 116 is coupled, in turn, to upper actuator 114 and lower actuator 118 by way of flexible shafts 126 and 128, respectively. Drive shafts 124, 126, and 128 ensure that actuators 114, 116, and 118, and thus all attachment points on transcowl 112, move in a substantially synchronized manner. Motor 120 commands actuator 116, and thus actuators 114 and 118, to retract or extend their respective shafts to move transcowl 112 between a deployed position (vanes 104 exposed as shown) and a stowed position (vanes 104 covered), respectively. Transcowl actuation system 110 further comprises one or more manual drive units (MDU), which allow the manual actuation of transcowl 112 during routine maintenance. For example, as illustrated in FIG. 2, transcowl actuation system 110 may include a MDU 130 coupled to center ball ballscrew actuator 116.

Figure 3:
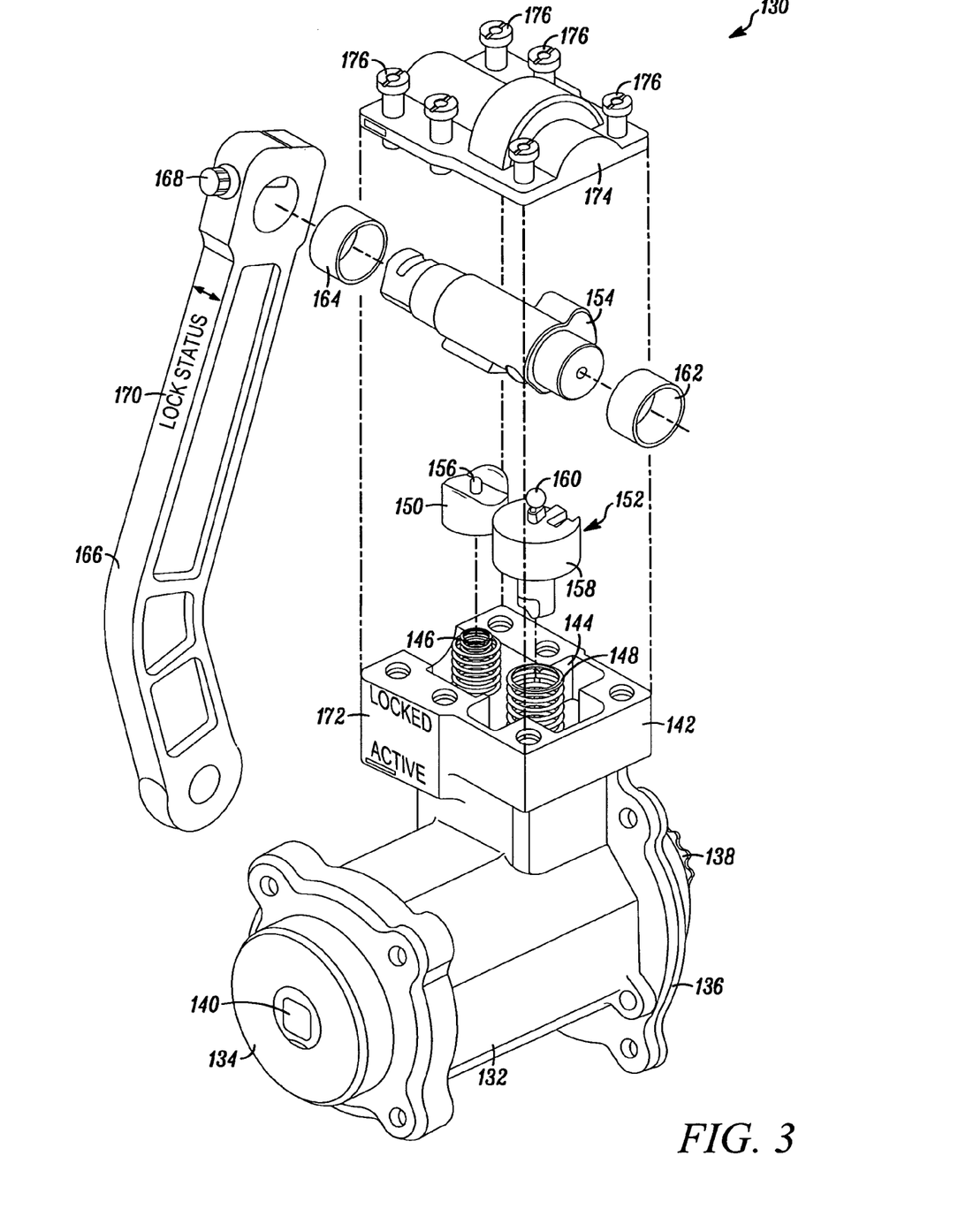
FIGS. 3 and 4 are exploded and top views, respectively, of the MDU shown in FIG. 2 including a bi-directional locking ring assembly in accordance with a first exemplary embodiment of the present invention.
Figure 4:
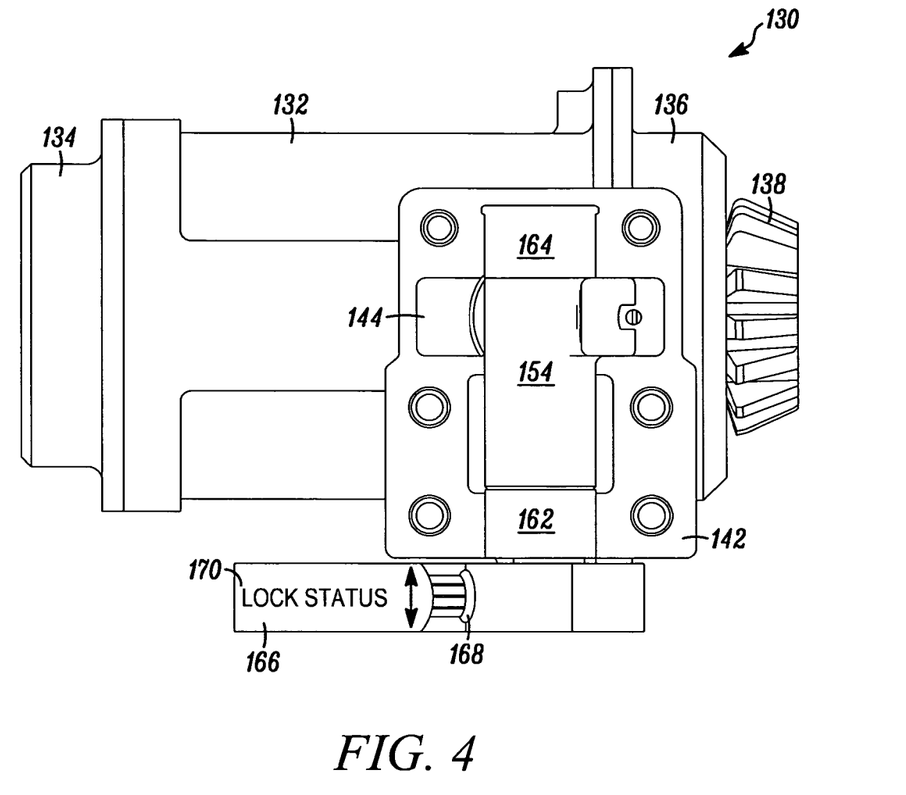

FIGS. 3 and 4 are exploded and top views, respectively, of MDU 130 including a bi-directional locking ring assembly in accordance with a first exemplary embodiment of the present invention. MDU 130 comprises a housing 132 having end plates 134 and 136 coupled to opposite ends thereof. A rotatable shaft (shown in FIGS. 6 and 7, as described below) is mounted in housing 132. A first end of the rotatable shaft extends through end plate 136 and is fixedly (e.g., integrally) coupled to a bevel gear 138. When MDU 130 is coupled to center ballscrew actuator 116, bevel gear 138 engages a gear (e.g., another bevel gear) mechanically coupled to ballscrew actuator 116. Thus, when MDU 130 is coupled to center ballscrew actuator 116, rotational movement of bevel gear 138 results in the translational movement of the shaft of center ballscrew actuator 116 (FIG. 2) and, consequently, the translation movement of the shaft of upper ballscrew actuator 114 and the shaft of lower ballscrew actuator 118 (FIG. 2). A cavity 140 is provided through end plate 134. MDU 130 is configured such that a specialized tool may be inserted into cavity 140 and turned to rotate bevel gear 138 and, therefore, to manipulate ballscrew actuators 114, 116, and 118.

An upper portion 142 of housing 132 includes a cavity 144 therein. Cavity 144 receives multiple components comprising the bi-directional locking ring assembly, namely a first spring 146, a second spring 148, a latching body 150, a rack tooth or pin 152, and a rotatable pin actuator shaft 154. Latching body 150 includes a stem 156, and pin 152 includes an annular flange 158 and a stem 160. As shown in FIG. 3, first and second springs 146 and 148 are first disposed adjacent each other in cavity 144 such that a first end of each spring contacts an inner surface of upper portion 142. Next, latching body 150 and pin 152 are positioned within cavity 144 to abut the opposite end of springs 146 and 148, respectively. In the case of pin 152, spring 148 may be partially received in an annular cavity provided in annular flange 158 (described below) and the lower body of pin 152 may pass through spring 148. When disposed within cavity 144 in this manner, latching body 150 and pin 152 are biased away from housing 132 by springs 146 and 148, respectively.

Pin actuator shaft 154 is rotatably mounted in cavity 144 over latching body 150 and pin 152. To facilitate rotational movement of shaft 154, first and second annular bearings or collars 162 and 164 may be disposed around opposite ends of shaft 154. A manual actuator (e.g., an arm) 166 is coupled to an end of shaft 154 by way of, for example, a fastener 168. Arm 166 is accessible from the exterior of housing 132 and permits the manual rotation of shaft 154 and, thus, the manual locking and unlocking of the bi-directional locking ring assembly. If desired, arm 166 and/or housing 132 may include markings thereon indicating locked and unlocked positions as shown at 170 and 172, respectively. After latching body 150, pin 152, and shaft 154 are disposed within cavity 144 in this manner, a cover 174 (shown only in FIG. 3) may be coupled to upper portion 142 via a plurality of fasteners (e.g., bolts) 176.

Figure 5:
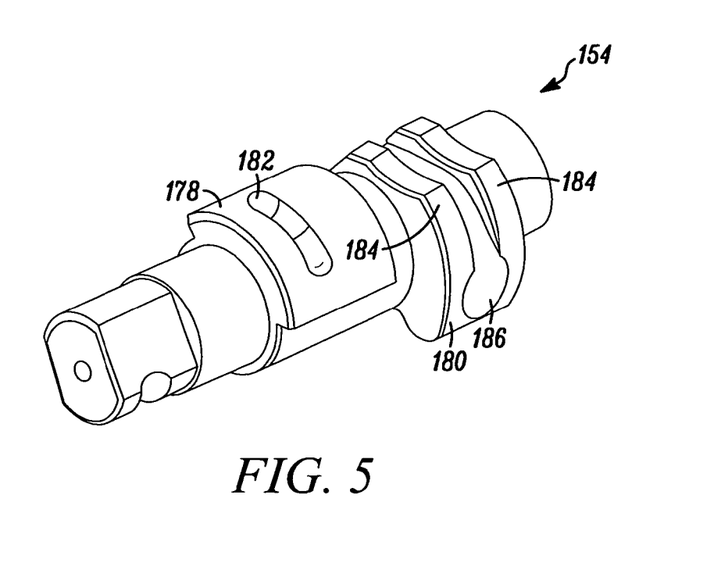
FIG. 5 is an isometric view of the rotatable pin actuator shaft shown in FIGS. 3 and 4.

FIG. 5 is an isometric view of shaft 154. Shaft 154 includes a latch portion 178 and a cam portion 180. Latch portion 178 comprises a raised surface having an elongated groove or arcuate channel 182 therein. Stem 156 of latching body 150 (FIG. 3) extends into channel 182 and is biased against the inner surface of channel 182 by spring 146 (FIG. 3). Channel 182 includes a plurality of detents therein. As shaft 154 rotates due to the manual turning of arm 166, stem 156 travels within channel 182 and encounters the detents provided in channel 182. When stem 156 encounters a detent, stem 156 extends into the detent and deters the further rotation of shaft 154 until a torque is applied thereto sufficient to overcome the force of spring 146 and retract stem 156. In this manner, latch portion 178 and latching body 150 cooperate to latch shaft 154 into a plurality of rotational positions corresponding to the detents formed in channel 182. For example, latch portion 178 and latching body 150 may cooperate to latch shaft 154 into a first rotational position wherein the bi-directional locking ring assembly is locked (i.e., wherein bevel gear 138 cannot be rotated in either rotational direction) and a second rotational position wherein the locking ring assembly is unlocked (i.e., bevel gear is free to be rotated in either rotational direction). This notwithstanding, it should be appreciated that the provision of a latching mechanism (e.g., latch portion 178 and latching body 150) is entirely optional and may not be included in certain embodiments of the inventive bi-directional locking ring assembly.

Rotatable shaft 154 serves as a pin actuator and engages pin 152 to move or to facilitate the movement of pin 152 between two stable positions: (1) an extended or engaged position wherein pin 152 prevents the bi-directional rotation of bevel gear 138, and (2) a retracted or disengaged position wherein pin 152 does not prevent the rotation of gear 138. As shaft 154 is rotated, cam portion 180 engages flange 158 and/or stem 160 to manipulate pin 152. In particular, when shaft 154 is rotated in a first direction, cam portion 180 forces pin 152 toward the center of housing 132 and into the engaged (extended) position, which results in the compression of spring 148. When shaft 154 is rotated in a second, opposite direction, cam portion 180 releases pin 152, which permits pin 152 to move into the disengaged (retracted) position under the force of compressed spring 148. Although by no means necessary, cam portion 180 may also be provided with a "pin pull" feature (described below) that exerts an upward force on stem 160 when shaft 154 is rotated in the second direction to further assist in returning pin 152 to the disengaged (retracted) position.

In the exemplary embodiment, cam portion 180 is provided with an outer contact surface 184 having an elongated groove or slot 186 therein. Slot 186 is dimensioned to receive stem 160 therein; that is, the geometry of slot 186 substantially conforms to the shape of stem 160. For example, if stem 160 has a generally bulbous shape as shown (most easily seen in FIG. 3), slot 186 preferably has a generally circular cross-section having an inner diameter slightly larger than the outer diameter of stem 160. The diameter of the outer portion of slot 186 is slightly narrowed or constricted such that stem 160 is captured within slot 186. As explained below, when shaft 154 is rotated in a first direction, the inner surface of slot 186 will engage the underside of stem 160 to help pull pin 152 toward the disengaged (retracted) position.

Figure 6:
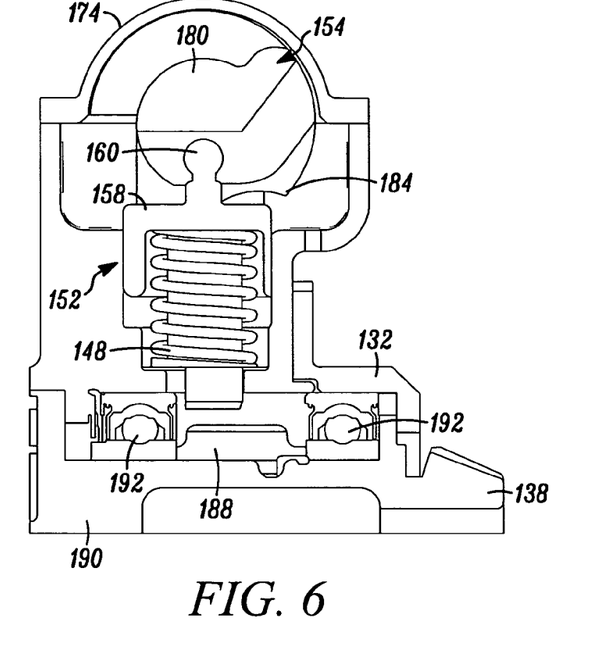
FIGS. 6 and 7 are cross-sectional views of the bi-directional locking ring assembly shown in FIGS. 3 and 4 in a disengaged position and an engaged position, respectively.
Figure 7:
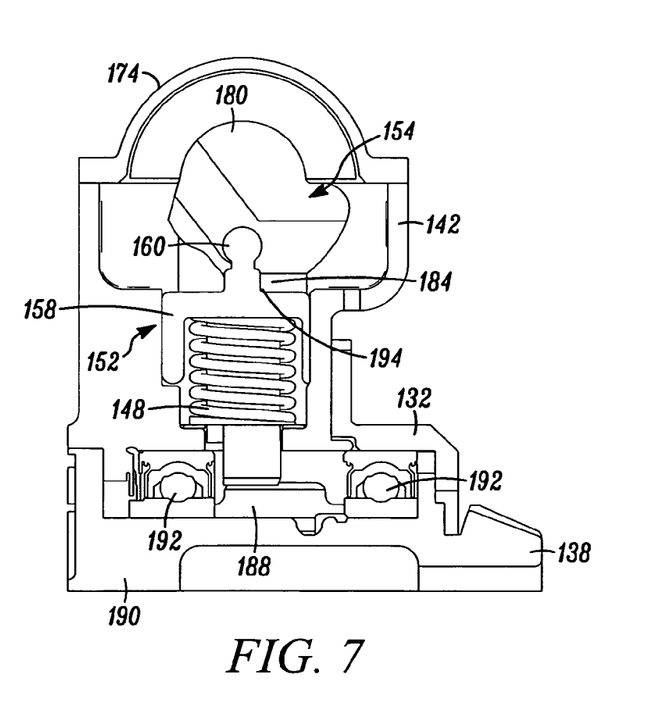

FIGS. 6 and 7 are cross-sectional views of the bi-directional locking ring assembly shown in FIGS. 3 and 4 in disengaged and engaged positions, respectively. It may be seen that the bi-directional locking ring assembly further comprises an annular gear 188, only a portion of which shown in FIGS. 6 and 7. It may also be seen in FIGS. 6 and 7 that flange 180 cooperates with the body of pin 152 to form an annular cavity. Spring 148 is received within this annular cavity such that a first end of spring 148 abuts the underside of flange 180 and a second end of spring 148 abuts an inner surface of housing 132. As stated previously, spring 148 is compressed when pin 152 descends into the engaged (extended) position (FIG. 7) and thus biases pin 152 toward the disengaged (retracted) position (FIG. 6).

Gear 188 is preferably a spur gear including a plurality of teeth circumferentially disposed around an outer surface thereof; however, it should be appreciated that gear 188 may be any rotary body (e.g., a spline) having a plurality of teeth thereon. Spur gear 188 rotates about the longitudinal axis of housing 132, or, when looking at FIGS. 6 and 7, into and out of the page. Spur gear 188 is mechanically coupled to a shaft 190, which is mounted for rotation in housing 132 of MDU 130. One or more annular bearings 192 may be disposed around shaft 190 to facilitate the rotational movement thereof. Bevel gear 138 is fixedly (e.g., integrally) coupled to shaft 190 and rotates along therewith. The rotation of bevel gear 138 thus imparts rotational movement to spur gear 188. Consequently, if spur gear 188 is prevented from rotating, shaft 190 (and thus bevel gear 138) will likewise be prevented from rotating.

As mentioned above, pin 152 is mounted in upper portion 142 of housing 132 for translation movement between two stable positions: (1) a disengaged position (FIG. 6) wherein pin 152 is retracted and does not contact spur gear 188, and (2) an engaged position (FIG. 7) wherein pin 152 is extended and resides between neighboring teeth of spur gear 188. In the engaged position (FIG. 7), pin 152 physically obstructs the rotation of spur gear 188 in both rotational directions. Consequently, when in the engaged position, pin 152 prevents the rotation of bevel gear 138 and thus the translation movement of ballscrew actuator 116 (FIG. 2). In this manner, moving pin 152 into the engaged position (FIG. 7) locks transcowl 112 (FIG. 2) into a desired position (e.g., the deployed position).

Rotating shaft 154 in a first rotational direction causes pin 152 to translate into the engaged (extended) position (FIG. 7) in the following manner. As shaft 152 rotates, contact surface 184 engages flange 158 and forces pin 152 toward spur gear 188. When shaft 180 has rotated fully into the engaged position (FIG. 7), contact surface 184 abuts flange 158 as shown at 194 and prevents pin 152 from retracting under the force of spring 148 and/or any force applied to pin 152 by spur gear 188. In this manner, cam portion 180 of shaft 154 locks pin 152 in the engaged position wherein pin 152 physically obstructs the rotation of spur gear 188 in both rotational directions.

Pin 152 transitions from the engaged (extended) position (FIG. 7) to the disengaged (retracted) position (FIG. 6) in the following manner. First, shaft 154 is rotated such that contact surface 184 of cam portion 180 no longer contacts the upper portion of flange 158 (although another portion of cam portion 180 may still contact the upper portion of flange 158 to help retain pin 152 within housing 190). This permits pin 152 to move into the disengaged position (FIG. 6) under the expansion force of spring 148. In addition, the inner surface of slot 186 engages the underside of stem 160 to pull pin 152 into the disengaged (retracted) position. The provision of such a "pin pull" feature (e.g., stem 160 and slot 186) in addition to a biasing feature (e.g., spring 148) ensures the proper retraction of pin 152 despite shear forces that may be applied thereto by spur gear 188.

Figure 8:
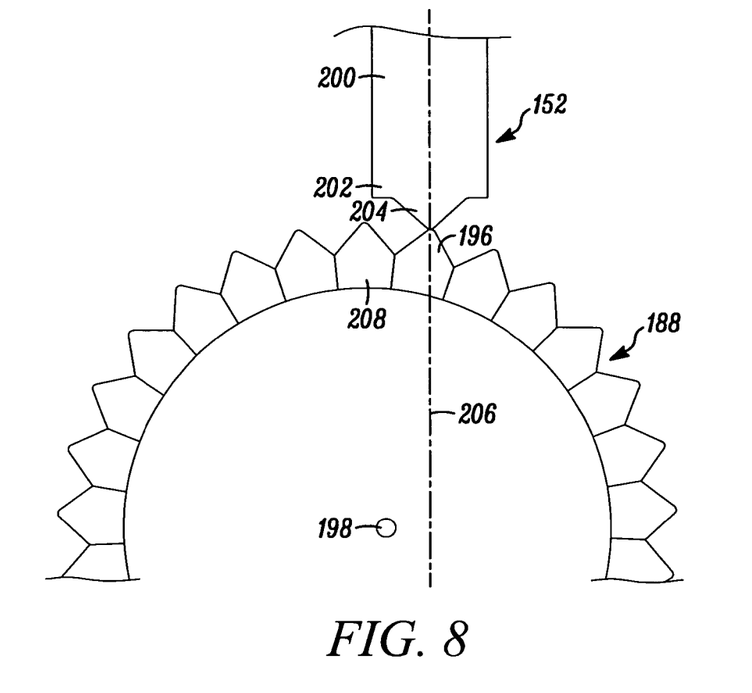
FIG. 8 is a front cutaway view of the pin shown in FIGS. 3, 4, 6, and 7 and the spur gear shown in FIGS. 6 and 7 in tip-to-tip engagement.

In accordance with an exemplary embodiment of the present invention, the apex of pin 152 is positioned relative to spur gear 188 such that stable jamming conditions are substantially eliminated. FIG. 8 is a front cutaway view of a portion of pin 152 and spur gear 188 illustrating tip-to-tip engagement between pin 152 and a tooth 196 of gear 188. Spur gear 188 is configured to rotate about rotational axis 198, and pin 152 comprises an elongated body 200 including a head 202 having an apex 204. Apex 204 is centered such that head 202 is substantially symmetrical. As pin 152 translates between the engaged (extended) position and the disengaged (retracted) position, apex 204 moves along line of travel 206, which, in this particular case, substantially overlaps with the longitudinal axis of body 200. Line of travel 206 does not pass through rotational axis 198, but is instead offset therefrom by a predetermined distance. As a result of this offset, tip-to-tip engagement between apex 204 of pin 152 and tooth 196 (or any other tooth of spur gear 188) results in a destabilizing moment inducing the clockwise rotation of spur gear 188. The rotation of spur gear 188 permits pin 152 to move fully into the engaged (extended) position wherein apex 204 resides between tooth 196 and a second tooth 208 to prevent further rotation of spur gear 188 in either rotational direction.

The exemplary embodiment of the bi-directional locking ring assembly is thus configured to rotate spur gear 188 toward a particular rotational direction (i.e., clockwise) upon tip-to-tip engagement. Other embodiments of the locking ring assembly may reposition pin 152 such that spur gear 188 is biased toward the opposite rotational direction (i.e., counterclockwise) upon tip-to-tip engagement. It is preferable, however, that spur gear 188 is biased toward the rotational direction corresponding to the stowed position of transcowl 112 to ensure that transcowl 112 is fully returned to the stowed position prior to flight.

Figure 9:
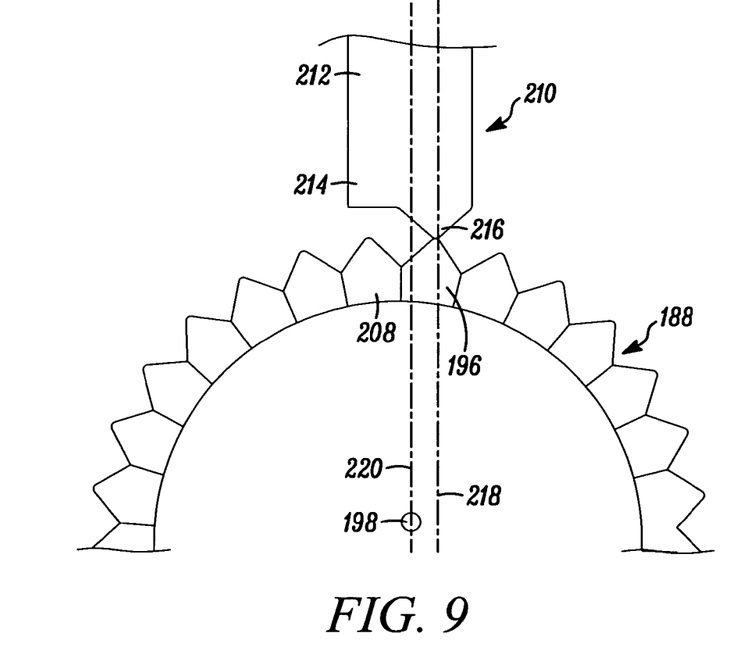
FIG. 9 is a front cutaway view of a pin and a spur gear in tip-to-tip engagement in accordance with a second exemplary embodiment of the present invention.

FIG. 9 is a front cutaway view of a pin 210 and spur gear 188 in tip-to-tip engagement in accordance with a second exemplary embodiment of the bi-directional locking ring assembly. Like pin 200 (FIG. 8), pin 210 comprises an elongated body 212 including a head 214 having an apex 216. However, unlike pin 200, apex 216 is off center such that head 214 is asymmetrical. As pin 210 translates between the engaged (extended) position and the disengaged (retracted) position, apex 216 moves along line of travel 218. Line of travel 218 does not pass through the rotational axis 198 of spur gear 188. In contrast, longitudinal axis 220 of body 212 does pass through rotational axis 198, but does not pass through apex 216. As was the case previously, tip-to-tip engagement of apex 216 and the tip of tooth 196 (or any other tooth of spur gear 188) results in a destabilizing moment that induces clockwise rotation of spur gear 188. The rotation of spur gear 188 permits pin 210 to move fully into the engaged (extended) position wherein apex 216 resides between tooth 196 and tooth 208 to obstruct rotation of spur gear 188 in either rotational direction thereby locking the ring assembly in place.

In view of the above, it should be appreciated that a bi-directional locking ring assembly has been provided that substantially eliminates the occurrence of stable jamming conditions. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A thrust reverser, comprising:
    at least one transcowl movable between a stowed position and a deployed position; and
    a manual drive unit enabling manual actuation of the transcowl during thrust reverser maintenance, the manual drive unit including a bi-directional locking ring assembly for locking the transcowl in a desired position, the bi-directional locking ring assembly comprising:
    a housing;
    a gear having a plurality of teeth and coupled to said housing to rotate in opposite directions about a rotational axis;
    a pin coupled to said housing and having an apex configured to travel along a line that does not pass through the rotational axis of said gear, said pin configured to translate between (1) a disengaged position wherein said gear is free to rotate, and (2) an engaged position wherein said apex resides between two of said plurality of teeth to prevent rotation of said gear in both rotational directions; and
    a pin actuator coupled to said housing and configured to engage said pin to selectively lock said pin in the engaged position;
    wherein the gear rotates in a first rotational direction when the manual drive unit is utilized to move the transcowl from the deployed position toward the stowed position, and wherein the pin of the bi-directional locking ring assembly biases the gear in the first rotational direction when the apex of the pin contacts the tip portion of the one of the plurality of teeth to ensure that the transcowl is fully returned to the stowed position by the manual drive unit after thrust reverser maintenance.

2. A thrust reverser according to claim 1 wherein said gear is a spur gear.

3. A thrust reverser according to claim 1 wherein said pin is disposed in said housing such that a longitudinal axis of said pin passes through the rotational axis of said gear and not through said apex.

4. A thrust reverser according to claim 1 wherein the longitudinal axis of said pin passes through said apex and not through the rotational axis of said gear.

5. A thrust reverser according to claim 1 wherein said pin is biased toward the disengaged position.

6. A thrust reverser according to claim 5 wherein said pin includes a flange portion, and wherein the bi-directional locking ring assembly further comprises a spring disposed between said flange portion and an inner surface of said housing.

7. A thrust reverser according to claim 1 further comprising a manual actuator coupled to said pin actuator and accessible from the exterior of the housing.

8. A thrust reverser according to claim 1 wherein said pin actuator comprises a rotatable shaft including a cam portion configured to force said pin toward the engaged position when said rotatable shaft is rotated in a first direction.

9. A thrust reverser according to claim 8 wherein said cam portion comprises a contact surface configured to engage said flange portion and force said pin toward the engaged position when said rotatable shaft is rotated in a first direction.

10. A thrust reverser according to claim 8 wherein said pin further comprises a stem, and wherein said cam portion further comprises a slot in which said stem is received, the inner surface of said slot configured to engage said stem to pull said pin away from the engaged position when said rotatable shaft is rotated in a second direction.

11. A thrust reverser according to claim 1 wherein said pin is positioned relative to said gear such that said gear is biased in a chosen rotational direction when said apex contacts the tip of one of said plurality of teeth.

12. A thrust reverser according to claim 1 wherein said pin comprises a single apex.

13. A thrust reverser, comprising:
    at least one transcowl movable between a stowed position and a deployed position; and
    a manual drive unit enabling manual actuation of the transcowl during thrust reverser maintenance, the manual drive unit including a bi-directional locking ring assembly for locking the transcowl in a desired position, the bi-directional locking ring assembly, comprising:
    a housing;
    a spur gear mounted in said housing for bi-directional rotation about a rotational axis;
    a pin comprising a body and a head having an apex, said pin mounted in said housing for translational movement between (1) a disengaged position wherein said gear is free to rotate, and (2) an engaged position wherein said apex resides between two teeth of said spur gear to obstruct the bi-directional rotational movement thereof, said pin positioned relative to said spur gear such that the line of travel of said apex is offset from the rotational axis of said spur gear;
    a pin actuator mounted in said housing and configured to selectively engage said body to lock said pin in the engaged position; and
    a manual actuator coupled to said pin actuator and accessible from the exterior of the housing to permit the manual actuation of the pin between the engaged position and the disengaged position;

wherein the gear rotates in a first rotational direction when the manual drive unit is utilized to move the transcowl from the deployed position toward the stowed position, and wherein the pin of the bi-directional locking ring assembly biases the gear in the first rotational direction when the apex of the pin contacts the tip portion of the one of the plurality of teeth to ensure that the transcowl is fully returned to the stowed position by the manual drive unit after thrust reverser maintenance.

14. A thrust reverser according to claim 13 wherein the longitudinal axis of said pin passes through the rotational axis, and wherein said head is asymmetrical.

15. A thrust reverser according to claim 13 wherein the longitudinal axis of said pin does not pass through the rotational axis, and wherein said head is symmetrical.

16. A thrust reverser according to claim 13 wherein said pin actuator comprises a rotatable shaft, and wherein said pin is biased toward said rotatable shaft.

17. A thrust reverser according to claim 16 further comprising a latching body biased toward said rotatable shaft, and wherein said rotatable shaft comprises:

a cam portion configured to engage an end of said body to actuate said pin; and a latching portion configured engage an end of said latching body to latch said rotatable shaft in a first rotational position corresponding to the engaged position and a second rotational position corresponding to the disengaged position.

18. A thrust reverser according to claim 17 wherein said body further comprises a stem substantially opposite said apex, and wherein said cam portion further comprises a slot dimensioned to capture said stem therein.

19. A thrust reverser, comprising:

at least one moveable thrust reverser component movable between a stowed position and a deployed position; and a bi-directional locking ring assembly comprising:

a housing;

a spur gear having a plurality teeth circumferentially disposed along an outer annular surface thereof, said spur gear rotationally mounted in said housing;

a rack tooth having a single apex, said rack tooth mounted in said housing for translational movement between (1) a disengaged position wherein said single apex does not contact said spur gear and (2) an engaged position wherein said single apex resides between neighboring ones of said plurality of teeth such that said single apex prevents the rotation said spur gear in both rotational directions, said rack tooth positioned relative to said spur gear such that the line of travel through said single apex is offset from the rotational axis of said spur gear;

a rotatable actuator shaft mounted in said housing and configured to selectively engage said rack tooth to lock said rack tooth in the engaged position; and an arm coupled to said rotatable actuator shaft and accessible from the exterior of the housing, said arm configured to be turned to rotate said rotatable actuator shaft and move said rack tooth between the disengaged position and the engaged position;

wherein the gear rotates in a first rotational direction when the manual drive unit is utilized to move the movable thrust reverser component from the deployed position toward the stowed position, and wherein the pin of the bi-directional locking ring assembly biases the gear in the first rotational direction when the apex of the pin contacts the tip portion of the one of the plurality of teeth to ensure that the movable thrust reverser component is fully returned to the stowed position by the manual drive unit after thrust reverser maintenance.

\* \* \* \* \*